Patented Jan. 12, 1937

2,067,854

UNITED STATES PATENT OFFICE 2,067,854

DEODORIZATION OF POLYMERIZED HALOPRENE AND PRODUCT

Alexander D. Macdonald, Malden, Mass., assignor to B. B. Chemical Co., Boston, Mass., a corporation of Massachusetts No Drawing. Application December 3, 1934, Serial No. 755,852

13 Claims. (Cl. 260—6)

This invention relates to polymerized haloprenes and more particularly to the removal of the characteristic and pungent odor from commercial polymerized chloroprene.

Polymerized chloroprene, a synthetic plastic rubber-like material marketed under the commercial name of "DuPrene", has a number of commercial applications, including its use in adhesive compositions. Commercial polymerized chloroprene has a penetrating and pungent odor which is, at least to some degree, offensive. For many commercial applications the odor of the DuPrene is perhaps immaterial, whereas for other purposes, including certain adhesive uses, the characteristic DuPrene odor is highly undesirable, both to the operator employing the material in the course of manufacture, and to the user of the finished article.

The chemical nature of the malodorant constituents of commercial polymerized chloroprene is not known to me but tests which I have made indicate that it includes a portion volatilizable at or below 200° F. and a portion volatilizable at higher temperatures. The odor which is pungent, rather disagreeable, and fairly lasting suggests to some extent the odor of "tear gas."

An object of this invention is to remove the malodorant constituents of commercial plastic polymerized chloroprene to such an extent that the undesirable odor will be inappreciable or entirely absent to operators employing the polymerized chloroprene in manufacturing operations. Another object is to remove such malodorants to such an extent that a finished article, such as one the component parts of which have been adhesively secured together by polymerized chloroprene, will not have any residual odor obnoxious or apparent to the purchaser or user of such article. A further object is to provide a method of removing such odor without impairing the properties of polymerized chloroprene for adhesive or other purposes.

Other objects will be apparent to those skilled in the art to which this invention appertains from the accompanying disclosure and claims.

In the accomplishment of the above and other objects I have found that the malodorant constituents of commercial plastic polymerized chloroprene, for example DuPrene, may be substantially completely removed by providing said DuPrene in a form in which it has a surface area relatively large as compared with its mass or volume and extracting said DuPrene with a selective solvent for the malodorant constituents thereof, namely, a solvent which will dissolve the malodorant constituents of DuPrene, but which is a non-solvent for polymerized chloroprene itself. For the purposes of this invention, the surface area of the DuPrene is rendered sufficiently large, and the thickness thereof sufficiently small, so that the selective solvent may penetrate readily therethrough, and so that the malodorant constituents, after being dissolved in the solvent, may readily diffuse out of the DuPrene. The DuPrene is preferably reduced to a thickness of the order of $\frac{1}{32}$ inch, and not greater than $\frac{1}{16}$ inch. Illustratively, the DuPrene may be formed into a thin sheet, or may be subdivided into small particles. In sheet form, preferably at least 6 square feet of sheet DuPrene to the pound is provided.

I have discovered that certain materials are selective solvents for the malodorant constituents of plastic polymerized chloroprene, and therefore the invention contemplates the extraction of polymerized chloroprene of large surface area with one or more solvents of the arbitrary class consisting of aliphatic monohydric alcohols, saturated or unsaturated liquid aliphatic hydrocarbons, ethers, naphtha, saturated cyclic hydrocarbons and their derivatives, and related and equivalent compounds. A preferred group of solvents comprises the aliphatic monohydric alcohols, such as methyl, ethyl, propyl, and butyl alcohols, and, generally speaking, of this group I prefer the use of ethyl alcohol, partly because of its efficient extractive action, non-toxic properties, low cost, and availability. It will be understood, of course, that the invention in its broader aspects contemplates the use of any selective solvent for the malodorant constituents of plastic polymerized chloroprene.

In order to accelerate the extraction of the malodorant constituents relative motion is preferably provided between the polymerized chloroprene and the solvent. The extraction may be further accelerated by treating the polymerized chloroprene successively with fresh portions of solvent, or a bath of solvent may be progressively refreshed, as by withdrawing a portion of the solvent, removing dissolved malodorant constituents and returning the solvent to the bath.

One result of this invention is the production of a new and useful product, namely, plastic polymerized chloroprene free from the characteristic and undesirable odor hitherto associated with the commercial product.

The invention may, of course, be carried out in various ways certain of which are illustrated in the following examples:

*Example I*

DuPrene is wet-sheeted to an average thickness of about 1/32 inch. This sheet material is placed in a rotatable drum, together with ethyl alcohol, and the drum rotated and the sheeted DuPrene and alcohol thus agitated together until the solution rate of the malodorant constituents of the sheeted DuPrene in the alcohol appears to diminish materially. Then the alcohol is removed and replaced with fresh alcohol and the agitation resumed. This process is repeated with fresh portions of alcohol until the DuPrene has been deodorized to the desired extent.

*Example II*

DuPrene is sheeted to a thickness of somewhat less than 1/4 inch. About 50 pounds of such DuPrene and 150 pounds of solidified carbon dioxide ("Dry Ice") are placed in a ball mill together with cast iron balls. The DuPrene is then crushed or ground for a period in the neighborhood of 3 1/2 hours. During this operation the DuPrene is chilled to a temperature at which it is quite brittle, said DuPrene being reduced by the action of the cast iron balls to a finely divided, somewhat shredded condition, in which it has a very large surface area in comparison with its mass or volume.

The thus ground DuPrene may then be removed from the ball mill, permitted to warm up to room temperature, and extracted with a solvent in any suitable manner. For example, the DuPrene may be placed in trays to a depth of somewhat less than 1/2 inch. The trays may then be arranged in cascade fashion and ethyl alcohol permitted to trickle over the DuPrene from one tray to another until the DuPrene is substantially completely deodorized.

*Example III*

The DuPrene to be treated is sheeted out to a thickness of about 1/32 inch, in which condition about 6 square feet of material weighs approximately 1 pound. The sheeted-out DuPrene may then be cut into fairly small pieces, for example, a few inches square, and placed in a rotatable wire basket, which in turn is rotatably disposed in a drum. The drum may be filled with ethyl alcohol to a level such that upon rotation of the wire basket ample contact of the continuously moving DuPrene and the alcohol is provided, in order to promote the extraction of the malodorant DuPrene constituents by the quantity of alcohol in the drum. The alcohol may be continuously refreshed, for example, by continuously drawing off a small proportion of the alcohol from the drum, distilling the alcohol and thus freeing it from the greater portion of the malodorant solute, and returning the distilled alcohol continuously to the drum, thus maintaining a substantially constant level of alcohol in the drum. The DuPrene may be drummed in this manner for about 5 days after which the DuPrene is rinsed or washed with fresh alcohol in order to prevent any residuum of the extracted malodorant material from being redeposited upon the surface of the DuPrene after the evaporation of the solvent alcohol.

DuPrene treated in the above manner is substantially free from any detectable traces of the malodorant constituents.

The efficacy of the above-described deodorizing process appears to be due in large part to the fact that the dimension of the polymerized chloroprene is sufficiently small so that the selective solvent for the malodorant constituents may readily penetrate through the polymerized chloroprene, and so that the malodorant constituents, after solution in the solvent, may readily diffuse out of the mass or body of the polymerized chloroprene.

The rate of deodorization increases with the smallness of dimension, or fineness of subdivision, of the polymerized chloroprene, and the time required for deodorization may be regulated accordingly. The invention contemplates, of course, any suitable mode of imparting small dimension and large surface area to the polymerized chloroprene.

The refreshing of the solvent, in order to increase the rate of extraction, may of course be accomplished in any suitable way, and is not limited to the distillation method described hereinabove.

Preferably, following the extraction operation, the polymerized chloroprene is washed with fresh alcohol in order to prevent any residuum of the extracted malodorant material from being redeposited upon the surface of the polymerized chloroprene after the evaporation of the solvent alcohol.

Polymerized chloroprene in its commercial and undeodorized form usually contains from 1 to 2% of a stabilizing material, such as phenyl-beta-naphthylamine or phenyl-alpha-naphthylamine, in order to prevent premature curing of the polymerized chloroprene. Since phenyl-beta-naphthylamine and other similar substances are soluble in ethyl alcohol such stabilizing material would be in a large measure removed by the use of ethyl alcohol as a solvent. It is in many cases desirable, therefore, after the deodorizing operation, to incorporate into the deodorized polymerized chloroprene from 1 to 2% of a stabilizer, such as phenyl-beta-naphthylamine.

When the method of this invention is carried out by means of naphtha or certain of the other selective solvents mentioned hereinabove, the polymerized chloroprene is swelled to some degree thereby. In cases where the polymerized chloroprene in swelled form, or the presence of the solvent, is not desirable, excess solvent may be removed in any suitable manner, such as by pressing or centrifuging the swelled polymer.

The plastic polymerized chloroprene deodorized in accordance with this invention may be employed in the arts in the same manner as undeodorized plastic polymerized chloroprene. Thus, the polymerized chloroprene deodorized according to this invention may subsequently be compounded and subjected to various manufacturing steps in the same manner as if the polymerized chloroprene had not been deodorized. Furthermore, the polymerized chloroprene may be employed in the preparation of adhesive compositions in like manner as if no deodorizing treatment had been carried out. However, adhesives prepared from polymerized chloroprene deodorized in accordance with this invention are free from the highly undesirable odor hitherto associated with such adhesives while, on the other hand, the mechanical properties of the adhesive are in no way impaired by reason of the deodorization.

It will be apparent that as a result of this invention many new uses for polymerized chloroprene are made possible, particularly in cases where the undesirable odor associated with undeodorized polymerized chloroprene would be a bar.

It is further to be noted that by this invention there has been provided a new product, plastic polymerized chloroprene, free from malodorant material, which has many and varied uses in the arts.

Having described my invention, what I claim as new and desire to secure by Letters Patent of the United States is:

1. The method of deodorizing plastic polymerized haloprene which comprises providing the polymerized haloprene with a large surface area as compared to the mass thereof and such that the thickness of the polymer will not be greater than about $\frac{1}{16}$ inch, and subjecting said polymerized haloprene to the action of a selective solvent for the malodorant constituents thereof.

2. The method of deodorizing plastic polymerized chloroprene which comprises reducing the polymerized chloroprene to a thickness not greater than about $\frac{1}{16}$ inch, and extracting said polymerized chloroprene with an aliphatic monohydric alcohol.

3. The method of deodorizing plastic polymerized chloroprene which comprises sheeting said polymerized chloroprene to provide at least about 6 square feet of sheet material to the pound, and removing the malodorant constituents from said sheet material by subjecting it to the extractive action of a selective solvent for said malodorant constituents.

4. The method of deodorizing plastic polymerized chloroprene which comprises providing said polymerized chloroprene with an average thickness of the order of $\frac{1}{32}$ inch, drumming said polymerized chloroprene in a bath of aliphatic monohydric alcohol, progressively refreshing said alcohol, and continuing said drumming until the malodorant constituents have been removed from said polymerized chloroprene.

5. The method of deodorizing plastic polymerized chloroprene which comprises providing said polymerized chloroprene with an average thickness of the order of $\frac{1}{32}$ inch, drumming said polymerized chloroprene in a bath of ethyl alcohol, progressively refreshing said ethyl alcohol, continuing said drumming until the malodorant constituents have been removed from said polymerized chloroprene, and during said drumming progressively withdrawing a portion of the alcohol bath, distilling the withdrawn alcohol to separate it from the dissolved malodorant constituents, and returning the distilled refreshed alcohol to said bath.

6. The method of deodorizing plastic polymerized chloroprene which comprises providing the polymerized chloroprene with a surface area large as compared to the mass thereof and such that the average thickness of the polymer is less than about $\frac{1}{16}$ inch, extracting said polymerized chloroprene with a solvent for the malodorant constituents thereof, and after said extraction washing said polymerized chloroprene with fresh solvent, thereby to prevent deposition of dissolved malodorant material upon the surface of said polymerized chloroprene.

7. The method of deodorizing plastic polymerized chloroprene which comprises providing the polymerized chloroprene with a surface area large as compared to the volume thereof and such that the average thickness of the polymer is less than about $\frac{1}{16}$ inch, extracting said polymerized chloroprene successively with fresh portions of selective solvent for the malodorant constituents of said polymerized chloroprene, and continuing said successive extractions until the polymerized chloroprene has been deodorized.

8. The method of deodorizing plastic polymerized chloroprene which comprises chilling said polymerized chloroprene until it becomes brittle, reducing the brittle polymerized chloroprene to small dimensions, and extracting the reduced polymerized chloroprene with a selective solvent for the malodorant constituents thereof.

9. The method of deodorizing plastic polymerized chloroprene which comprises contacting solidified carbon dioxide therewith until the polymerized chloroprene is rendered brittle, crushing the brittle polymerized chloroprene to particles of small dimensions, and extracting the crushed polymerized chloroprene with a selective solvent for the malodorant constituents of said polymerized chloroprene.

10. The method of deodorizing plastic polymerized chloroprene which comprises providing said polymer with an average thickness for solvent passage through the substance thereof of the order of about $\frac{1}{32}$ inch, soaking said polymer in a bath of a solvent of the class consisting of aliphatic monohydric alcohols, providing relative motion between the polymer and the solvent, progressively removing dissolved malodorant material from the solvent bath, and finally treating the polymer with solvent containing no dissolved malodorant material.

11. The method of deodorizing plastic polymerized chloroprene which comprises sheeting said polymer to provide at least about 6 square feet of sheet material to the pound, drumming said sheet polymer in a bath of ethyl alcohol, progressively withdrawing a portion of the alcohol solution of malodorant material, and replacing said solution with alcohol free from dissolved malodorant material, continuing said drumming, solution withdrawal and alcohol replacement until the desired deodorization of the plastic polymer has been accomplished, and washing said plastic polymer with fresh alcohol, thereby removing any clinging malodorant material from the surface thereof.

12. The herein-described malodorant-free plastic polymerized chloroprene product obtained by providing the polymerized chloroprene with a large surface area as compared to the mass thereof and such that the thickness of the polymer will not be greater than about $\frac{1}{16}$ inch, and subjecting said polymerized chloroprene to the action of a selective solvent for the malodorant constituents thereof.

13. The herein-described malodorant-free plastic polymerized chloroprene product obtained by sheeting said polymerized chloroprene to provide at least about six square feet of sheet material to the pound, and removing the malodorant constituents from said sheet material by subjecting it to the extractive action of ethyl alcohol.

ALEXANDER D. MACDONALD.